United States Patent [19]

Weeks et al.

[11] 3,987,919
[45] Oct. 26, 1976

[54] GENERAL PURPOSE LOGISTIC TRAILER

[75] Inventors: Douglas H. Weeks, Pacific Palisades; David A. Bond, Rolling Hills; Warren C. Schreyer, Palos Verdes Peninsula; John M. Bloodworth, Huntington Beach, all of Calif.

[73] Assignee: The United States of America as represented by the Secretary of the Navy, Washington, D.C.

[22] Filed: Oct. 28, 1975

[21] Appl. No.: 626,530

[52] U.S. Cl. .............................. 214/506; 214/517; 214/512; 280/80 B; 280/81 R
[51] Int. Cl.² ............................................ B60P 1/04
[58] Field of Search .......... 214/506, 505, 517, 85.1, 214/512; 280/80 B, 81 R, 763, 764, 765, 766, 415 R, 415 B, 43.23, 43.16, 43.2, 43, 43.13

[56] References Cited
UNITED STATES PATENTS

| | | |
|---|---|---|
| 1,887,118 | 11/1932 | Collinge .......................... 280/80 B |
| 2,021,952 | 11/1935 | Wren .................................. 214/517 |
| 2,789,714 | 4/1957 | Norris ................................ 214/506 |
| 3,191,966 | 6/1965 | Felburn ......................... 280/81 R X |
| 3,257,020 | 6/1966 | Fairclough ..................... 214/85.1 X |
| 3,410,576 | 11/1968 | Turpen ....................... 280/415 B X |
| 3,861,716 | 1/1975 | Baxter et al. ................. 280/81 R X |

FOREIGN PATENTS OR APPLICATIONS 726,877  3/1932  France ............................... 214/505

Primary Examiner—Victor A. DiPalma
Attorney, Agent, or Firm—Richard S. Sciascia; Don D. Doty; Harvey A. David

[57] ABSTRACT

A manually operable self-loading trailer of wagon configuration is described wherein tailgate ramps are operated by jacks to elevate rear end of trailer while rear carriage is moved adjacent front carriage, and then to lower rear end of bed to near ground. Jacks incorporated in carriages permit altering of bed height and attitude and aid in converting trailer to tandem axle semi-trailer.

12 Claims, 7 Drawing Figures

GENERAL PURPOSE LOGISTIC TRAILER

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to trailers, and more particularly to a general purpose logistics trailer that is capable of self-loading and unloading large containers or other objects through manual effort only, is also capable of being converted from a steerable wagon configuration, to a load-equalized tandem axle semi-trailer configuration, and is capable of assuming a variety of stances with respect to a supporting surface.

DISCUSSION OF THE PRIOR ART

The art of load hauling trailers has been lacking in trailer units capable of self-loading and unloading of large objects such as containerized military equipment, personnel shelters, and the like at remote locations. There has also been a need for a versatile, general purpose load hauling trailer, the bed of which can be readily leveled and otherwise altered in height to accommodate sloping support surfaces such as are met in certain cargo carrying aircraft, to provide clearances when traversing unusual, off-highway, terrain, and to compensate for uneven load distribution.

Various self-unloading trucks and trailers have been proposed, usually incorporating combinations of tailgate elevator platforms, cargo booms, and the like. These are useful for heavy objects of a size considerably smaller than the overall bed dimensions of the vehicle, but are of little applicability when a containerized load is of a size that is substantially congruent with the vehicle bed.

SUMMARY OF THE INVENTION

The present invention aims to overcome most or all of the shortcomings of the prior art and to fulfill specific needs as a carrier suited to military logistics, disaster relief operations, and the like, where air lifting may be required and powered loading and unloading equipment is not often available. The invention has achieved this through novel constructions, combinations, and arrangements of parts including wheel carriages that incorporate a plurality of adjustable jack means for altering carriage height and that are selectively positionable relative to the trailer bed and to one another. Also included are folding bed extensions or tailgate jacks that are operable to support one end of the bed during positioning of the carriages, and to serve as a loading ramp, when required.

With the foregoing in mind, it is a principal object of the invention to provide an improved general purpose logistics trailer.

Another object of the invention is the provision of a trailer that can be manually operated to load and unload large, heavy containers or objects.

Still another object of the invention is to provide a trailer that is readily convertible between a steerable wagon configuration and a dual-axle semi-trailer configuration.

Yet another object is the provision of a trailer that is adustable in bed height above the road and is adjustable in tilt and pitch, as well.

As another object the invention aims to incorporate the foregoing features in a particularly rugged, raliable, and economically constructed vehicle.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 5:
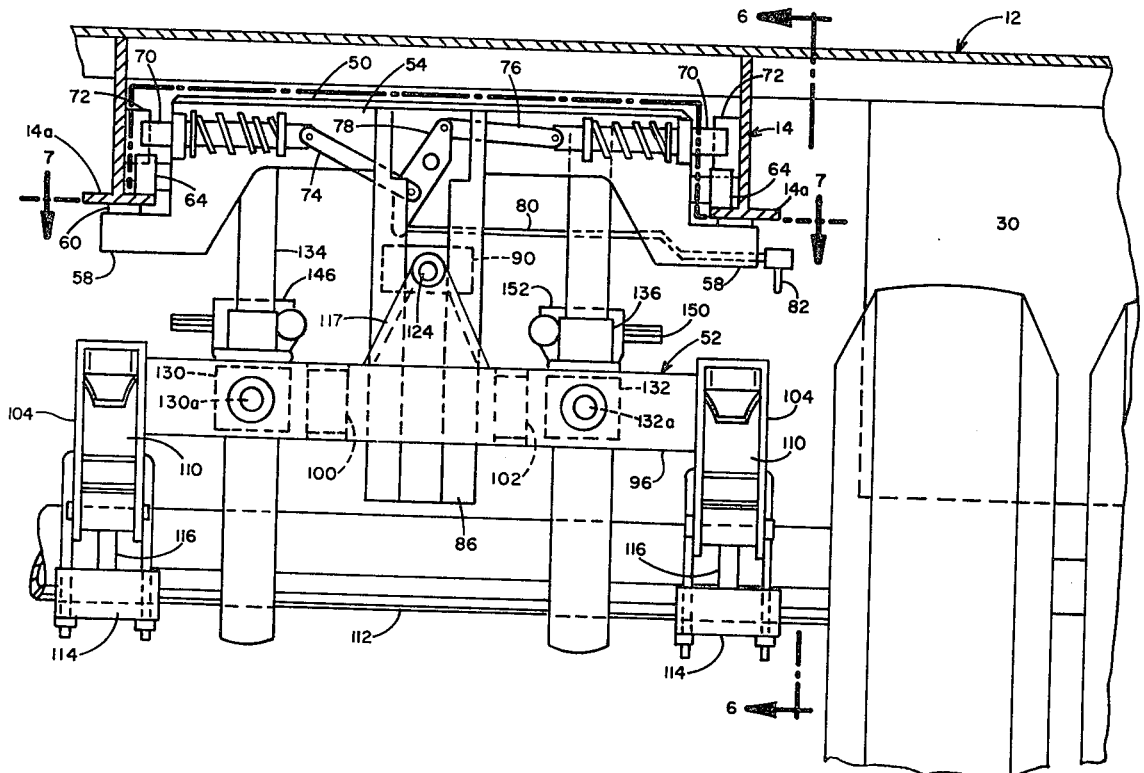
FIG. 5 is a fragmentary sectional view, on an enlarged scale, taken substantially along line 5—5 of FIG. 1.
Figure 6:
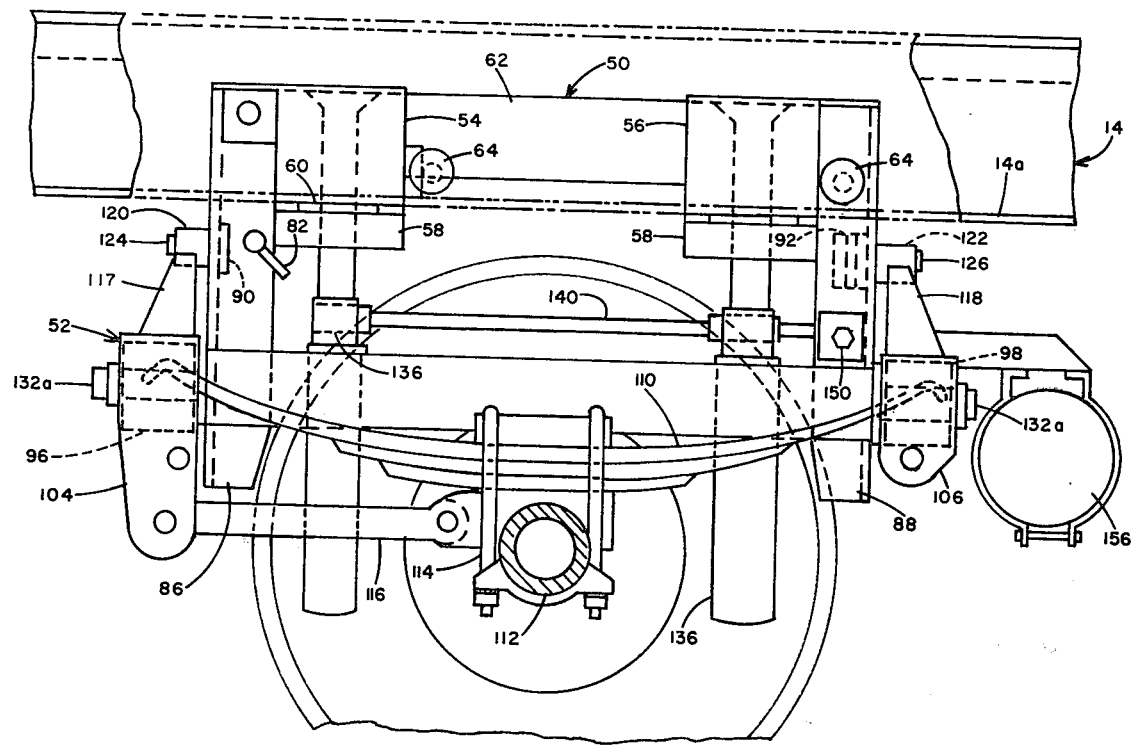
FIG. 6 is a fragmentary sectional view taken substantially along line 6—6 of FIG. 5.
Figure 7:
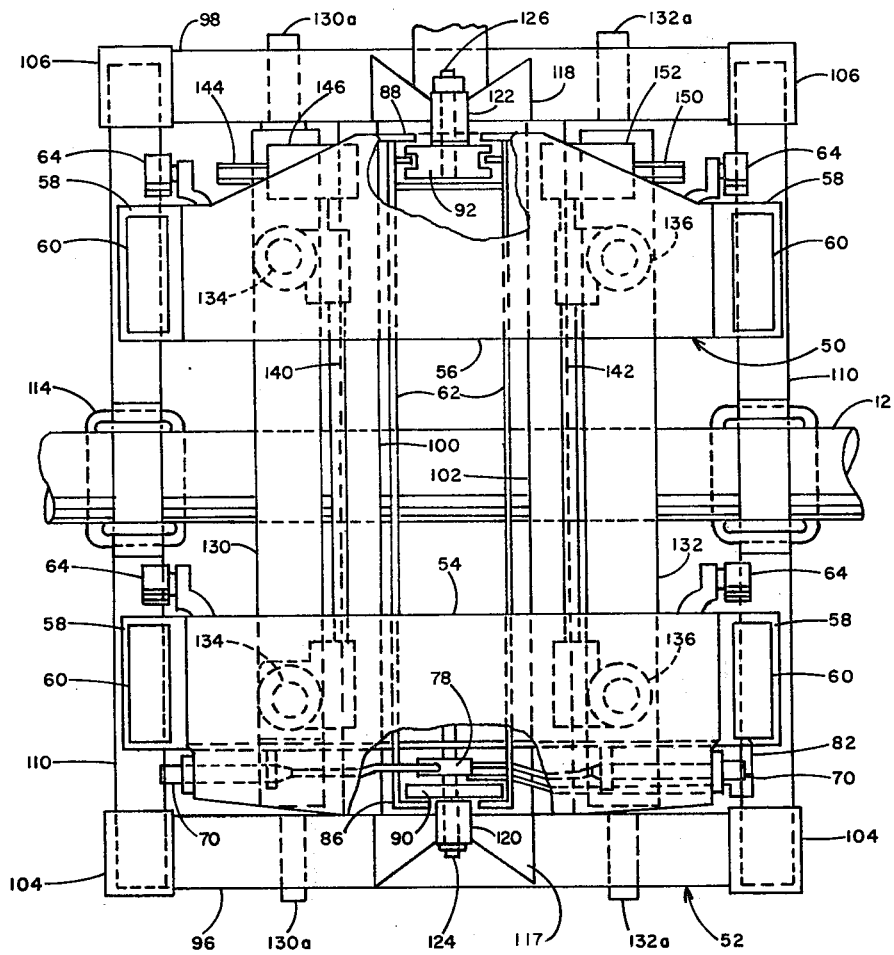
FIG. 7 is a fragmentary sectional view taken substantially along line 7—7 of FIG. 5.

In the form of the invention illustrated in the drawings and described hereinafter, and with particular reference first to FIG. 1, a general purpose logistics trailer 10 comprises a bed 12 that is generally rectangular in plan and is supported by a frame 14 to constitute a frame and bed combination wherein the frame comprises parallel longitudinal rails extending from the rear end of the combination to near the front end thereof. A dirigible front wheel carriage 16 comprises a "fifth wheel" bearing plate 18 and is pivotally connected to frame 14 by a kingpin 20. A yoke type tongue or towbar 22 extends forward from carriage 16 and comprises a suitable hitch for connection to a towing vehicle. A rear wheel carriage 26 is connected to the frame 14 near the rear thereof. Carriages 16 and 26, the constructions of which will presently be described in more detail with reference to FIGS. 5–7, are each movable to selected positions along frame 14 for the purposes of facilitating trailer loading and unloading, for accommodating a variety of load and/or use conditions. The wheel carriages also incorporate bed height varying jack mechanisms by which the elevation and attitude of bed frame 14 and bed 12 can be adjustably varied.

Mounted at opposite corners of the rear edge of bed 12 are articulated tailgate ramps 30 each having a first section 30a pivoted at 32 to the bed and having a second section 30b pivoted at 34 to the first section. Tailgates 30 further comprise a ground engaging base plate 30c at the distal ends of sections 30b. Screw jacks 36 are mounted between frame 14 and sections 30a of the articulated tailgates ramps whereby the tailgate ramps can be used to elevate and/or support the rear portion of the trailer 10.

Figure 2:
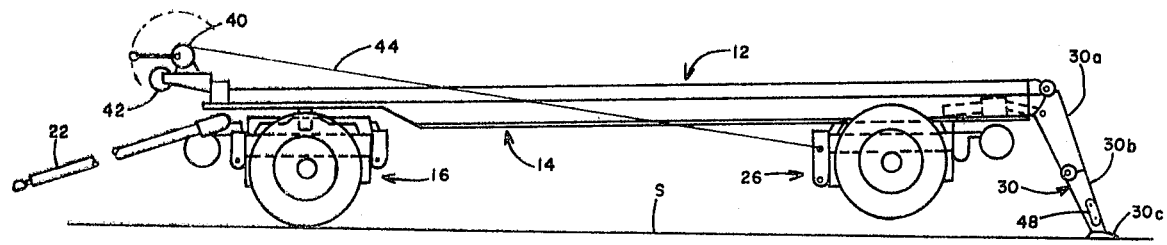
FIG. 2 is a side elevational view of the trailer of FIG. 1, shown partially supported by its tailgate jacking mechanisms and with the rear wheel carriage being shifted forward.

Thus, referring to FIG. 2, with tailgate ramp sections 30a, 30b aligned, and plate 30c engaging the ground or other support surface S, jacks 36 may be operated to elevate the trailer frame and bed, thereby raising the wheels of carriage 26 clear of the support surface S.

Figure 3:
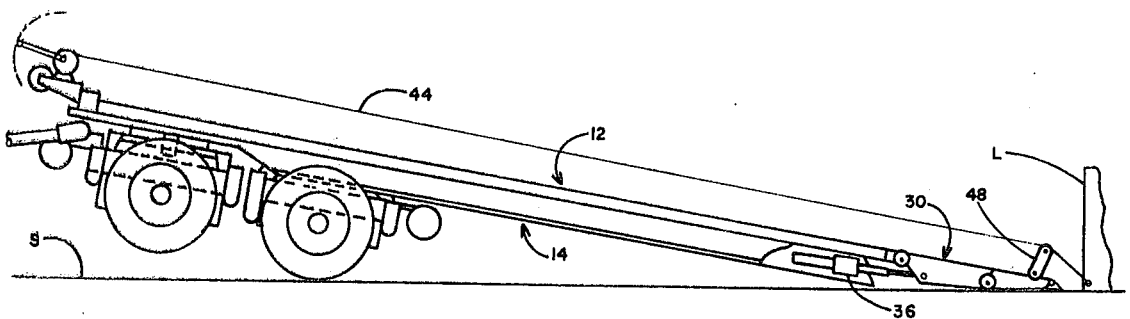
FIG. 3 is a side elevational view of the trailer of FIG. 1, shown in a loading position.

Mounted at opposite corners of the front edge of bed 12 are winches 40 and sheaves 42. As shown in FIG. 2, cables 44 leading from winches 40 may be used to move carriage 26 forward along frame 14. When carriage 26 is adjacent carriage 16, as in FIG. 3, jacks 36 may be operated to allow tailgate ramps 30 to lower the rear portion of the trailer substantially to the ground, with the tailgate ramps forming an extension between bed 12 and ground surface S. In this position, cables 44 may be attached to a load L and winches 40 operated to draw the load onto ramps 30 and bed 12. A pivoted sheave arm 48, having a sheave at the outer end thereof, is provided on each tailgate ramp 30. The arms 48 serve as short gin poles in cooperation with cable 44 to lift load L up onto the respective ramps at the initial phase of drawing the load onto the ramps. Arms 48 are then retracted to their storage positions alongside ramp sections 30b, and the load is then pulled directly.

With the load in position on bed 12, the jacks 36 are again operated elevate the rear portion of the trailer sufficiently for the wheels of carriage 26 to clear the ground. Cables 44 are then led around the sheaves of sheave arms 48, and forward to carriage 26. Operation of winches 40 then serves to return carriage 26 to its rear position, and tailgate ramps 30 are folded to place the trailer in the condition of FIG. 1, but with a load aboard.

Figure 4:
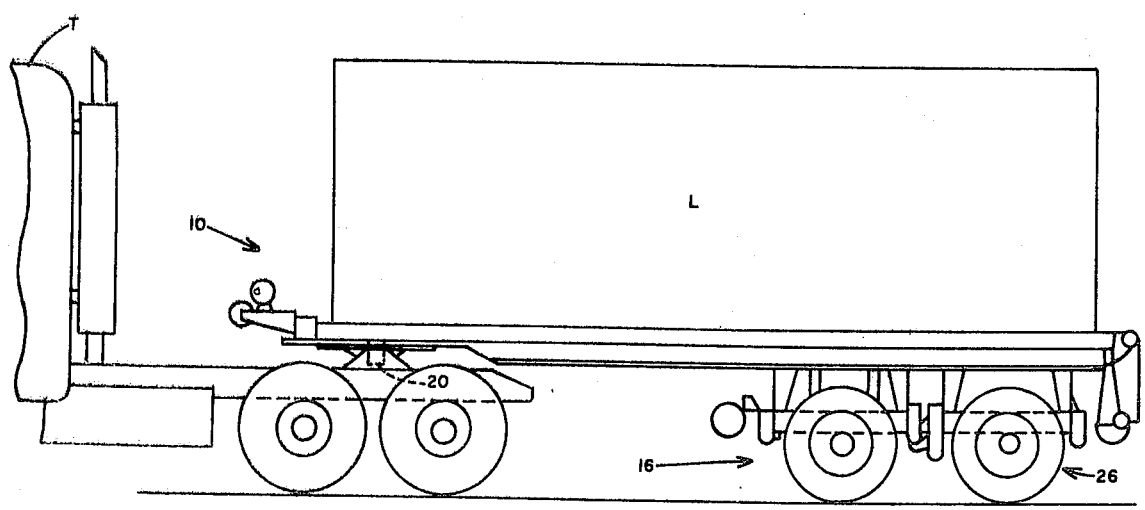
FIG. 4 is a side elevational view of the trailer of FIG. 1 shown in a semi-trailer configuration in association with a tractor.

At times, such as when a standard truck tractor T is available, and a heavier than usual load L is required to be hauled, it is advantageous to use both carriages 16 and 26 at the rear portion of the trailer in the dual axle configuration illustrated in FIG. 4, and have the front portion of the trailer 10 supported by the tractor. In this configuration the kingpin 20 mates with the standard fifth wheel connection means of the tractor.

Figure 1:
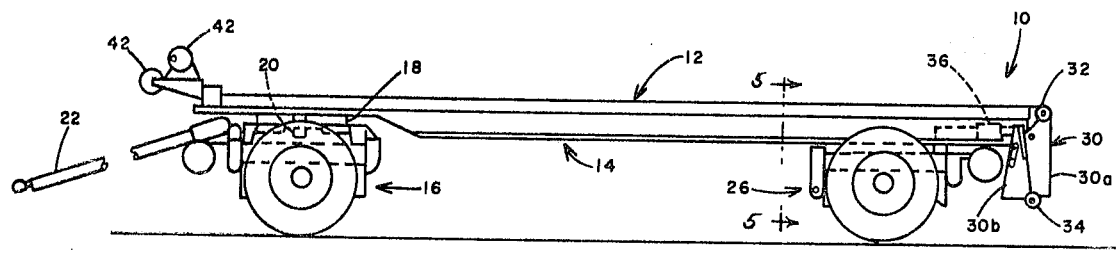
FIG. 1 is a side elevational view of a general purpose logistics trailer embodying the invention and shown in a steerable wagon configuration.

It will be observed at this point that the elevation of bed 12 and frame 14 is greater than in FIG. 1. The conversion to the dual axle configuration and the adjustment of the bed height are accomplished through the agency of the earlier mentioned jacks incorporated in the carriages 16 and 26, the constructions of which will now be described with reference to FIGS. 5–7.

Carriage 26, which except for the omission of the fifth wheel and kingpin latch is substantially identical to carriage 16, comprises an upper frame 50 and a lower frame 52. Upper frame 50 comprises a pair of transverse frame members 54 and 56 having extensions 58 adapted to engage the underside of flanges 14a of trailer frame 14. Extensions 58 are provided with suitable pads 60, best seen in FIG. 7.

Transverse frame members 54 and 56 are rigidly interconnected by fore and aft frame members 62, and are provided with four rollers 64 adapted to engage the upper surfaces of trailer frame flanges 14a. Rollers 64 support carriage 26 from frame 14 when the latter is elevated sufficiently for the wheels of that carriage to clear the ground, and permit easy movement of the carriage along the frame. When the wheels are on the ground, frame 14 is supported by extensions 58 of the carriage upper frame.

Carriage position latch means are mounted on upper frame 50 and comprise a pair of spring biased bolts or plungers 70 that cooperate with suitable blocks or stops 72 on frame 14. Plungers 70 are connected by links 74, 76 to a lever 78 pivoted with respect to frame 50, and are operated by a rod 80, terminating in an easily accessible handle 82, that withdraws the plungers 70 from the stops 72.

Upper frame 50 further comprises a pair of vertical channel members 86, 88 depending from transverse frame members 54, 56, respectively, and serve as guiding supports for trunnion blocks 90, 92 forming part of an adjustable pivotal connection between upper frame 50 and lower frame 52.

Lower frame 52 comprises a pair of spaced, transverse frame members 96, 98, rigidly interconnected by fore and aft frame members 100, 102. Fixed, as by welding, to the outer ends of transverse frame member 96 are spring end brackets 104, and to the outer ends of transverse frame member 98 are spring end brackets 106. Leaf springs 110 have their ends received in brackets 104, 106, and have their mid portions fixed to an axle 112 by suitable U-bolt clamps 114. Suitable links 116 are pivotally connected between brackets 104 and clamps 114 for maintaining axle and springs in position.

Mounted on the upper surfaces of transverse members 96, 98 are trunnion bearing supports 117, 118 carrying coaxial bearings 120, 122, respectively. Trunnions 124, 126 extend from trunnion blocks 90, 92 through bearings 120, 122, respectively, and serve to connect lower frame 52 to upper frame 50 for pivotal movement about a longitudinal axis through trunnions 124, 126.

Extending between, and pivotally connected to, transverse frame members 96 and 98 are fore and aft members 96 and 98 are fore and aft members 130 and 132 which serve as carriage jack supports. Member 130 is so pivotally connected by stub shafts 130a, while member 132 is pivotally connected by stub shafts 132a. Mounted on member 130 are a pair of jacks 134, while a pair of jacks 136 are mounted on member 132.

Jacks 134 are interconnected for simultaneous operation by a rotary shaft 140 and jacks 136 are interconnected for simultaneous operation by a rotary shaft 142. Operation of jacks 134 is achieved by a suitable crank applied to a shaft 144 of a right-angle drive gear box 146 connected to an extension of shaft 140. Similarly, operation of jacks 136 is achieved by a suitable crank applied to a shaft 140 of a right-angle drive gear box 152 connected to an extension of shaft 142.

The upper ends of the jacks 134, 136 are connected to transverse members 54 and 56 of the upper frame 50. It will be appreciated that uniform extension of both sets of jacks will raise the trailer bed height, while retraction of the jacks will lower the bed height, the changes being accommodated by the trunnion blocks 90, 92 sliding in the respective channel members 86, 88. It will also be appreciated that the sets of jacks 132, 134 may be operated independently to effect lateral tilt of the trailer bed, for example to level the bed and load when the trailer 10 is resting on uneven terrain.

As mentioned earlier, carriages 16 and 26 are substantially identical with the exception of the inclusion of a conventional fifth wheel coupling 18 on carriage 16, and accordingly further description of carriage 16 is unnecssary. Suffice it to say that when carriage 16 is uncoupled from kingpin 20, it may be engaged with frame 14 and moved therealong in exactly the same manner as carriage 26.

Each of the axles conveniently carry suitable wheel brake means (not shown), such as conventional air brakes, and hence an air pressure reserve tank 156 is provided on each carriage for operation of such brakes.

The self contained, manually operable jacks 134, 136 in each wheel carriage, together with the manually operable tailgate ramp jacks 36, render it practical for personnel to carry out the maneuvers and changes in trailer configurations, including loading and unloading of large loads, as outlined above with reference to FIG. 4, without assistance of power and/or any auxiliary equipment.

Other features may, of course, be desirably incorporated in tailer 10. For example, built in load securing devices, load equalizer couplings 160 between carriages 16 and 26 when in the dual axle configuration, and necessary road and clearance lights.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A self-loading trailer comprising in combination:
a trailer frame extending longitudinally of said trailer;
an elongate bed, having first and second ends, supported on said trailer frame and presenting a load carrying surface;
first and second carriage means, coupled to said trailer frame under first and second ends thereof corresponding to said first and second ends of said bed, for supporting said trailer frame and bed for rolling movement over a ground surface;
ramp means, pivotally connected to said second end of said bed, for movement between a plurality of positions including a trailer frame and bed end elevating position and an extended position presenting a ramp surface in substantially the same plane as said load carrying surface;
ramp jack means, connected between said trailer frame and said ramp means, for effecting movement of said ramp means between said positions; and said second carriage means being movable along said frame, from under said second end thereof, to a location adjacent said first carriage means while said frame and bed are held elevated at said second ends thereof by said ramp means, whereby said frame and bed are adapted to be tilted by gravity to pivot from a substantially horizontal position to an inclined position when said ramp jack means is operated to move said ramp means to said extended position.

2. A trailer as defined in claim 1, and further comprising:
winch and cable means, mounted at said first end of said bed, for pulling a load up said ramp surface and onto said load carrying surface.

3. A trailer as defined in claim 1, and wherein:
said first carriage means is pivotally connected to said frame so as to be steerable.

4. A trailer as defined in claim 1, and wherein:
said first carriage means is adapted to be moved along said frame from under said first end thereof to a location adjacent said second carriage means under said second end of said frame.

5. A trailer as defined in claim 1, and wherein said first and second carriage means each comprises:
an upper carriage frame releasably connect to said trailer frame; a lower carriage frame disposed in vertically spaced relation beneath said upper carriage frame, said upper carriage frame being connected to said lower carriage frame for tilting movement with respect to one another and for varying of said vertically spaced relation;
axle and wheel means, connected to said lower carriage frame; and
carriage jack means, between said upper carriage frame and said lower carriage frame, for effecting said varying of said vertically spaced relation.

6. A trailer as defined in claim 5, and wherein:
said trailer frame comprises a kingpin; and
said first carriage means comprises a fifth wheel and kingpin receiving pivotal connection means mounted on said upper carriage frame.

7. A trailer as defined in claim 6, and wherein:
said first carriage means is adapted to be moved along said frame from under said first end thereof to a location adjacent said second carriage means under said second end of said frame.

8. A trailer as defined in claim 7, and further comprising:
winch and cable means, mounted at said first end of said bed, for pulling a load up said ramp surface and onto said load carrying surface.

9. A trailer as defined in claim 8, and wherein said ramp means comprises:
first and second articulated ramps, said ramps each comprising a first section having one end pivoted to said bed for movement about a horizontal axis, and a second section having one end connected to the other end of said first section for limited pivotal movement between a folded storage position and an extended position aligned with said first section.

10. A trailer as defined in claim 9, and further comprising:
arm and sheave means, pivotally mounted on said ramps, for operation as a short gin pole in cooperation with said winch and cable means in pulling said load onto said ramps.

11. A trailer of the character described comprising:
a generally rectangular trailer frame and bed combination characterized as having a front end and a rear end and presenting an upwardly facing load carrying surface, said combination including parallel, longitudinal frame rails projecting below said surface and extending substantially from said rear end to near said front end;
a kingpin extending downwardly from adjacent said front end of said combination;
a front carriage and a rear carriage, each comprising an upper carriage frame, a lower carriage frame, vertically guided trunnion means for interconnecting said upper and lower carriage frames, carriage jack means for adjusting the elevation and lattitude of said upper carriage frame relative to said lower carriage frame, an axle and associated wheels, spring means for connecting said axle to said lower carriage frame, guide means for connecting said upper carriage to said frame rails for movement therealong, and releasable latch means for securing said carriage in selected positions along said frame rails;

said front carriage further comprising fifth wheel means for releasably receiving said kingpin and dirigibly supporting the front portion of said frame and bed combination, and towing tongue means for connection to a towing vehicle;

a pair of ramps pivotally connected to said rear end of said frame and bed combination for movement through a plurality of positions including a rear end elevating position and a load surface extending ramp position;

a pair of ramp jacks connected between said frame and bed combination and said ramps and operable to effect said movement of said ramps; and winch and cable means, mounted at said front end of said frame and bed combination, for use in moving said rear carriage to and from a frame and bed combination tilting position adjacent said front carriage, and for use in pulling a load over said ramps and onto said load carrying surface.

12. A trailer as defined in claim 11, and wherein said carriage jacks comprise two pairs of jacks associated with each of said carriages, the jacks of each pair being interconnected for simultaneous operation.

* * * * *